United States Patent
Kjaer et al.

(10) Patent No.: US 12,072,178 B2
(45) Date of Patent: Aug. 27, 2024

(54) 3D SCANNER USING A STRUCTURED BEAM OF PROBE LIGHT

(71) Applicant: 3SHAPE A/S, Copenhagen K (DK)

(72) Inventors: Rasmus Kjaer, Copenhagen K (DK); Thomas Allin Højgaard, Espergærde (DK); Herman Scherling, Kokkedal (DK)

(73) Assignee: 3SHAPE A/S, Copenhagen K (DK)

( * ) Notice: Subject to any disclaimer, the term of this patent is extended or adjusted under 35 U.S.C. 154(b) by 0 days.

(21) Appl. No.: 18/298,622

(22) Filed: Apr. 11, 2023

(65) Prior Publication Data

US 2023/0243645 A1    Aug. 3, 2023

Related U.S. Application Data

(63) Continuation of application No. 16/312,045, filed as application No. PCT/EP2017/065553 on Jun. 23, 2017, now Pat. No. 11,650,045.

(30) Foreign Application Priority Data

Jun. 24, 2016   (DK) .......................... PA 2016 70455

(51) Int. Cl.
*G01B 11/25* (2006.01)
*A61C 9/00* (2006.01)
(Continued)

(52) U.S. Cl.
CPC .......... *G01B 11/2513* (2013.01); *A61C 9/006* (2013.01); *A61C 13/0004* (2013.01);
(Continued)

(58) Field of Classification Search
CPC ..... A61C 9/006; A61C 13/0004; A61C 19/04; G01B 11/2513; G01B 11/25;
(Continued)

(56) References Cited

U.S. PATENT DOCUMENTS 7,142,312 B2   11/2006   Quadling et al.
7,859,640 B2   12/2010   Galstian et al.
(Continued)

FOREIGN PATENT DOCUMENTS

CA   2962695 A1   9/2017
CN   102008282 A   4/2011
(Continued)

OTHER PUBLICATIONS

International Search Report (PCT/ISA/210) mailed on Aug. 23, 2017, by the European Patent Office as the International Searching Authority for International Application No. PCT/EP2017/065553.
(Continued)

*Primary Examiner* — Neil R Mikeska
(74) *Attorney, Agent, or Firm* — BUCHANAN INGERSOLL & ROONEY PC

(57) ABSTRACT

A 3D scanner for recording the 3D topography of an object, the 3D scanner including: a projector unit configured for projecting a structured beam of probe light onto the object; an imaging unit arranged to acquire 2D images of the object when the object is illuminated by the structured probe light beam; and an actuator unit arranged to control the position of the structured probe light beam at the object by rotating a movable portion of the projector unit around a pivoting axis, the actuator unit including a rotation motor including or arranged to drive a wheel, where the surface of the wheel operatively coupled to the movable portion of the projector unit has a radial distance from the axis of the rotation motor which changes with the rotation.

38 Claims, 6 Drawing Sheets

(51) Int. Cl.
A61C 13/00 (2006.01)
A61C 19/04 (2006.01)
G02B 26/10 (2006.01)
G02B 30/60 (2020.01)
H04N 1/00 (2006.01)
H04N 1/04 (2006.01)

(52) U.S. Cl.
CPC .............. *A61C 19/04* (2013.01); *G01B 11/25* (2013.01); *G01B 11/2527* (2013.01); *G02B 26/10* (2013.01); *G02B 30/60* (2020.01); *H04N 1/00827* (2013.01); *H04N 1/04* (2013.01)

(58) Field of Classification Search
CPC .... G01B 11/2527; G02B 27/24; G02B 26/10; H04N 1/00827; H04N 1/04
See application file for complete search history.

(56) References Cited

U.S. PATENT DOCUMENTS

| | | | |
|---|---|---|---|
| 9,301,692 | B2 | 4/2016 | Kaji et al. |
| 9,969,121 | B2 | 5/2018 | Jeng et al. |
| 2002/0030725 | A1 | 3/2002 | Okugawa et al. |
| 2003/0160970 | A1 | 8/2003 | Basu et al. |
| 2004/0201856 | A1 | 10/2004 | Quadling et al. |
| 2006/0269896 | A1 | 11/2006 | Liu et al. |
| 2009/0103103 | A1 | 4/2009 | Berner |
| 2009/0231660 | A1 | 9/2009 | Huang |
| 2009/0298017 | A1 | 12/2009 | Boerjes et al. |
| 2011/0287387 | A1 | 11/2011 | Chen et al. |
| 2012/0001834 | A1 | 1/2012 | Hudman et al. |
| 2012/0092461 | A1 | 4/2012 | Fisker et al. |
| 2013/0016338 | A1 | 1/2013 | Bridges et al. |
| 2013/0077643 | A1 | 3/2013 | Spears |
| 2013/0236850 | A1 | 9/2013 | Wu et al. |
| 2014/0028805 | A1 | 1/2014 | Tohme |
| 2015/0182120 | A1 | 7/2015 | Sumi et al. |
| 2015/0260507 | A1 | 9/2015 | Aramaki |
| 2016/0008111 | A1 | 1/2016 | Jumpertz |
| 2016/0185047 | A1 | 6/2016 | Windau et al. |
| 2017/0280970 | A1 | 10/2017 | Sartor et al. |
| 2018/0125338 | A1 | 5/2018 | Pfeiffer et al. |
| 2019/0000412 | A1 | 1/2019 | Wong et al. |
| 2019/0162528 | A1 | 5/2019 | Kjaer et al. |

FOREIGN PATENT DOCUMENTS

| | | |
|---|---|---|
| CN | 102802520 A | 11/2012 |
| CN | 105102925 A | 11/2015 |
| CN | 105190232 A | 12/2015 |
| EP | 1519141 A2 | 3/2005 |
| EP | 2157455 A1 | 2/2010 |
| JP | 2013257166 A | 12/2013 |
| JP | 2015083978 A | 4/2015 |
| JP | 2015152926 A | 8/2015 |
| JP | 3200364 U | 9/2015 |
| TW | I369481 B | 8/2012 |
| WO | 2010145669 A1 | 12/2010 |
| WO | 2011120526 A1 | 10/2011 |
| WO | 2015026847 A1 | 2/2015 |
| WO | 2014084131 A1 | 1/2017 |

OTHER PUBLICATIONS

Jinjun Xu, Common knowledge evidence, Industrial Measurement Technology and Data Processing, Wuhan University Press, 1st edition, Feb. 2014. (3 pages).
Notice of Allowance issued on Jun. 28, 2022, by the Korean Patent Office in corresponding Korean Patent Application No. 10-2019-7002301, and an English Translation of the Office Action. (3 pages).
Preliminary Office Action issued on Jun. 15, 2022, by the Brazilian Patent Office in corresponding Brazilian Patent Application No. BR112018076410-8, and a partial English Translation of the Office Action. (5 pages).
Written Opinion (PCT/ISA/237) mailed on Aug. 23, 2017, by the European Patent Office as the International Searching Authority for International Application No. PCT/EP2017/065553.
Zhiyong Xue, et al., Common knowledge evidence, Fundamentals of Automobile Machinery, Jiangsu University Press, 1st edition, Aug. 2014. (3 pages).
Office Action (Notification of the First Office Action) issued on Mar. 31, 2022 by the China National Intellectual Property Administration in corresponding Chinese Patent Application No. 201780051664.2, and an English Translation of the Office Action. (19 pages).
Office Action (Third Office Action) issued on Sep. 27, 2021 by the China National Intellectual Property Administration in corresponding Chinese Patent Application No. 201780051664.2, and an English Translation of the Office Action. (19 pages).
First Office Action issued Apr. 9, 2020, by the Chinese Patent Office in corresponding Chinese Patent Application No. 201780051664.2, and an English Translation of the Office Action. (17 pages).
Notice to file Response issued in corresponding Korean Patent Application No. 10-20197002301, dated Nov. 30, 2021 with English Translation (11 pages).
"3D Scanner for Furniture Relief Carving," Furniture, 2007, China Academic Journal Electronic Publishing House, hhttp://www.cnki.net, No. 160 (2 pages). The article was listed as a category A reference in the Chinese Office Action dated Apr. 2, 2021.
Office Action (Notice of Reasons for Rejection) issued on Jun. 8, 2021, by the Japanese Patent Office in corresponding Japanese Patent Application No. 2018-566840, and an English Translation of the Office Action. (10 pages).
Communication pursuant to article 94(3) EPC issued in corresponding European Patent Application No. 17 734 037.9-1010, dated May 19, 2021. (5 pages).
Second Office Action issue on Apr. 2, 2021, by the Chinese Patent Office in corresponding Chinese Patent Application No. 201780051664.2, and an English Translation of the Office Action. (21 pages).

3D SCANNER USING A STRUCTURED BEAM OF PROBE LIGHT

CROSS REFERENCE TO RELATED APPLICATIONS

The present application is a continuation of U.S. application Ser. No. 16/312,045, filed on Dec. 20, 2018, which is a U.S. national stage of International Application No. PCT/EP2017/065553, filed on Jun. 23, 2017, which claims the benefit of Danish Application No. PA 2016 40455, filed on Jun. 24, 2016. The entire contents of each of U.S. application Ser. No. 16/312,045, International Application No. PCT/EP2017/065553, Danish Application No. PA 2016 40455 are hereby incorporated herein by reference in their entirety.

TECHNICAL FIELD

The application relates to three dimensional (3D) scanning of an object for recording a digital 3D representation of the object. In particular, the application relates to a 3D scanner capable of shifting the position of the probe light beam on the scanned object. One application is within dentistry, particularly for scanning dental impressions or physical dental models in a desktop scanner.

BACKGROUND 3D scanners which operate by projecting a beam of probe light onto the scanned object, such as the 3Shape D2000 desktop scanner, are known from the art. Such 3D scanners basically function by projecting a beam, e.g., a beam with a regular pattern of white lines, onto the scanned object. Some light in the projected beam is reflected from the object surface and captured by one or more cameras of the 3D scanner's imaging unit to acquire 2D images of the projected probe light. When e.g., lines in a structured light pattern are detected in the 2D image well-established projection geometry, such as triangulation, can be used to derive the 3D coordinates of the object surface. The object and at least part of the optical system of the 3D scanner are then moved relative to each other, e.g., by a rotation of the object and/or a linear motion of the projector unit and imaging unit, and new 2D images are acquired from which the 3D coordinates for other regions of the object are derived.

When a structured probe light beam is located at one position on the object surface, data will only be obtained from the regions of the surface illuminated by the brighter parts of the structured probe light beam. Data "between the lines" can then be obtained by moving the structured probe light beam over the sample a distance which is less than the period of the line pattern. Moving the structured beam across the object provides that sufficiently data can be acquired to reconstruct the surface of the object and express it as a digital 3D representation of the object. When data are obtained from the entire scanned region without any "dark spots" a precise digital 3D representation of the object can be generated from the acquired 2D images.

In some prior art 3D scanners, a gradual movement of a structured probe light beam across the object is often realized by moving at least part of the optical system including light source, lens systems and imaging unit relative to the object using expensive high-precision translation stages.

SUMMARY

Disclosed is a 3D scanner for recording a digital 3D representation of an object, the 3D scanner comprising:

a projector unit configured for projecting a beam of probe light onto the object;

an imaging unit arranged to acquire 2D images of the object when the object is illuminated by the probe light beam; and an actuator unit arranged to control the position of the probe light beam at the object by adjusting the orientation and/or position of a movable portion of the projector.

The actuator unit adjusts the orientation and/or position of the movable portion of the projector unit such that the probe light beam moves across the object while the scanner framework itself is kept substantially still relative to the object. When probe light beam is moved across the object data can be obtained from the entire scanned area of the surface.

The orientation and/or position of the movable portion can preferably be gradually adjusted providing for a gradual shift in the position of the probe light beam on the scanned object. This allows for a scanning where a structured probe light beam is moved smoothly over the surface of the object and where high-resolution data are obtained from relatively thin bright sections of the pattern in the structured probe beam light pattern. I.e. the movement is smooth on the scale of the structure in a structured probe light beam at the scanned object, such as when the structure has a pattern with a periodic variation in one direction across the structured beam of probe light and any stepwise adjustment of the orientation and/or position of the movable portion occurs is such that the change in the position of the pattern during one step is significantly smaller than the periodic variation, such as at least 5 times smaller, such as at least 10 times smaller, such as at least 15 times smaller, such as at least 20 times smaller.

During a scanning, the object and 3D scanner are arranged such that the object is located in the scan volume of the 3D scanner. In some embodiments, the scanner is a desktop scanner. Such desktop 3D scanners often have a holder for the object ensuring that the object is placed correctly relative to the scan volume. For a fast 3D scanner, such as the 3D scanner which can be realized using the concepts disclosed in the present application, the scanning may be sufficiently fast such that the object can be held by hand during scanning without shaking induced blur causes the recorded digital 3D representation to be inaccurate.

The digital 3D representation of the object can be derived from the acquired 2D images. Processing of the 2D images can be performed by a data processing unit of the 3D scanner, in an external unit to which the acquired 2D images are transferred from the 3D scanner, or one part of the processing can be performed in the 3D scanner and another part in an external unit. The external unit may be a personal computer or a dedicated data processing unit forming part of a scanner system which also comprises the 3D scanner. I.e., in some embodiments, the 3D scanner comprises or is connected to a data processing unit comprising a computer readable medium on which is stored a computer program product configured for generating a digital 3D representation expressing at least the 3D topography of the object based on the acquired 2D images.

The movable portion of the projector unit may hold one or more of the parts of the projector unit, such as all parts of the projector unit.

In some embodiments, the orientation is adjusted by rotating the movable portion of the projector unit around a pivoting axis.

The projector unit emits the probe light along an optical axis defined by the optical components and their relative arrangement in the projector unit. Changing the orientation of the movable portion of the projector the unit relative to the scanner framework provides that the angle of the optical axis of the projector unit relative to the scanner framework is changed. The rotation of the movable portion thereby provides that the probe light beam is moved across the object located in the scan volume of the scanner. I.e., the actuator unit can control the position of the probe light beam on the object by rotating the movable portion of the projector unit around the pivoting axis.

The angle of optical axis of the projector unit and the distance to the object arranged in the scan volume determines the transverse position of the probe light beam on the object. For a fixed distance, the translation of the beam across the object is thus determined by the change in the angle of the optical axis relative to the framework.

In the context of the present invention the phrase "transverse position" refers to the position of the probe light beam in a plane substantially perpendicular to the optical axis of the probe light beam at the object, while a "transverse plane" is a plane substantially perpendicular to the optical axis of the probe light beam at the object.

In some embodiments, the pivoting axis is substantially perpendicular to the optical axis of the projector unit.

In some embodiments, the pivoting axis intersects the optical axis of the projector unit. Having the pivoting axis substantially perpendicular to and intersecting the optical axis provides the simplest relationship between the rotation of the movable portion and the movement of the probe light beam in the scan volume of the 3D scanner, i.e., on the object placed in the scan volume.

In some embodiments, the beam of probe light is a structured beam comprising a spatial structure in the transverse plane.

When the structure in the probe light beam is uniform in one direction perpendicular to the optical axis of the projector unit, i.e., when the structure has no features which change along this direction, the rotation axis is preferably parallel to this uniform direction. At least the pivoting axis should not be perpendicular to the uniform direction and the optical axis since such a design would only move the structured beam along the uniform direction instead of across the structured beam.

In some embodiments, the actuator unit comprises a rotation motor comprising or being arranged to drive a wheel, where the surface of the wheel which is operatively coupled to the movable portion of the projector unit has a radial distance from the axis of the rotation motor which changes with the rotation.

For example, the distance from the force transferring outer surface of the wheel to the center of the wheel may increase with the rotation for a significant fraction of the circumference of the wheel.

Accordingly, disclosed is 3D scanner for recording a digital 3D representation of an object, the 3D scanner comprising:
- a projector unit configured for projecting a beam of probe light onto the object;
- an imaging unit arranged to acquire 2D images of the object when the object is illuminated by the probe light beam; and
- an actuator unit arranged to control the position of the probe light beam at the object by rotating a movable portion of the projector unit around a pivoting axis, the actuator unit comprising a rotation motor comprising or arranged to drive a wheel, where the surface of the wheel operatively coupled to the movable portion of the projector unit has a radial distance from the axis of the rotation motor which changes with the rotation.

Controlling the orientation of the movable portion of the projector unit using a wheel with a surface having an angle dependent radial distance, i.e. when the wheel surface does not follow a circle, provides a low-cost solution for a precise control of the position of the probe light beam compared to prior art solutions.

In the context of the present disclosure, the phrase "the wheel surface" refers to the surface operatively coupled to the projector unit.

One advantage of controlling the position of the probe beam on the scanned object by the orientation of the projector unit is that the beam position can be changed gradually and dynamically while keeping the object and scanner framework still. A gradual and smooth change in the position and/or orientation of the movable portion provides e.g., that the shift in the position of the pattern between two subsequently acquired 2D images can be determined simply by timing of the acquisition of the 2D images.

The actuator unit can be operatively coupled directly to the movable portion of the projector unit or indirectly via one or more intermediate components.

In some embodiments, the actuator unit is arranged to directly engage the movable portion of the projector unit. This can be achieved e.g., by placing the actuator unit next to the movable portion such that a very compact scanner design is provided.

In some embodiments, the axis of the rotation motor is perpendicular to the optical axis of the projector unit. When the motor rotates around an axis perpendicular to the optical axis the surface of the wheel moves along the optical axis whereby the rotation of the movable portion of the projector unit provides a translation of the probe light beam over the object surface.

When the radial distance of the surface increases while the wheel is rotated, the actuator provides a push to the movable portion of the projector unit, either directly or via intermediate components. The push providing for the rotation of the movable portion around the pivoting axis. Together with an elongated force-transferring member this offers a simple and compact design providing a highly precise movement of the probe light beam on the object.

In some embodiments, the wheel surface is smooth, i.e., without e.g., gearing teeth. This provides for a smooth and gradual shift in the rotation of the projector unit and hence of the position of the structured light pattern on the object. Also, avoiding gearing teeth has the advantage that hysteresis and slack when changing direction can be mitigated or completely avoided.

The wheel surface may be coated e.g., with a Teflon coating to reduce friction. A low-friction surface has the advantage that a smooth and continuously rotation of the movable portion of the projector unit can be realized such that the structured beam can be moved continuously over the object without sudden jumps due to a stick and slip type motion of between the wheel and the component it engages.

In some embodiments, the actuator unit comprises a low-friction element arranged in contact with said wheel surface, where the low-friction element is operatively coupled to the movable portion of the projector unit.

The surface of the wheel is then operatively coupled to the movable portion of the projector unit via the low-friction element which e.g., provides a push to the movable portion of the projector when the radius of the wheel increases.

The low-friction element may be constructed in various forms as can be determined by those skilled in the art. For example, the low-friction element may be a low-friction ball or roller which also can reduce the area of contact surface and thus friction. Such embodiments may be favored over a low-friction coating to mitigate or avoid problems relating to wear of the coating.

In some embodiments, the actuator unit comprises a piston arranged to control the position of the movable portion of the projector either directly or through a force-transferring element.

In some embodiments, the wheel surface is eccentric or is shaped according to an Archimedes spiral.

In the Archimedes spiral shaped wheel the radial distance of the force transferring surface from the center of the wheel increases linearly with the rotation angle over a majority of the wheel circumference. Thus, the rotation angle of the motor is converted into a rotation of the movable portion which is directly proportional to the motor rotation angle.

This is advantageous since it provides a simple relationship between the rotation motor angle and the translation of the structured probe beam across the scanned object.

In some embodiments, a force-transferring member is part of or is attached to the movable portion of the projector unit, and the actuator unit is arranged to engage a distal end of the force-transferring member.

The force transferring member is operatively connected to the actuator unit allowing the actuator unit to control the orientation of the movable portion of the projector unit relative to the framework and/or imaging unit of the 3D scanner.

The force-transferring member may be attached directly to the projector unit or via intermediate parts providing a fixed relative arrangement of the force-transferring member and the movable portion of the projector unit.

In some embodiments, the force-transferring member comprises an elongated member.

Having an elongated force-transferring member arranged perpendicular to the pivoting axis with the elongated element introducing a distance between the pivoting axis and the point where the actuator unit engages the force-transferring member, and hence is operatively coupled to the movable portion of the projector unit, provides that the rotation of the movable portion is smaller for a given change in the actuator unit. The longer the elongated force-transferring member the easier it is to control the rotation of the projector unit and hence the movement of the structured probe light beam on the object surface.

In some embodiments, the length of the elongated member is at least 2 cm, such as at least 3 cm, such as at least 5 cm, such as at least 8 cm, such as at least 10 cm, such as at least 15 cm.

In some embodiments, the ratio between the length and a cross sectional dimension of the of the elongated member is at least 2, such as at least 3, such as at least 5, such as at least 10, such as at least 20.

The 3D scanner may have a control unit or be connected to a control unit, such as a personal computer, where the control unit has a non-transitory computer readable medium encoded with computer program product.

A calibration of the 3D scanner can be performed to determine the precise correlation between the offset of the probe light beam and the rotation angle of the rotation motor. Such a correlation can be taken into account by the computer program product such that a constant speed of the movement of the probe light beam at the object can be provided. The rotation motor angle to beam position correlation can also be used to establish a link between a 2D image recorded using the imaging unit at a given rotation angle such that the position of the probe light beam when the given 2D image was recorded is known.

In some embodiments, the projector unit comprises a light source and a mask arranged to introduce the structure in the probe light beam.

In some embodiments, the mask has a fixed geometry.

A mask with a fixed geometry has the advantage that is provides a low-cost solution relative to e.g., MEMS array solutions.

The mask can be a transmission mask having e.g., alternating regions of higher or lower transmissivity such that some regions transmit a larger fraction of the incoming light from the light source thereby forming the structure in the probe light beam. The mask can be realized by defining regions of lower transmissivities on a transparent substrate, such as a glass plate. This can be realized e.g., by depositing a reflective or absorbing material on one surface of the plate defining regions of lower transmission such that the structure in the probe light beam is defined.

The mask can also be a reflective mask where some regions reflect a larger portion of the light such that the structure is formed in the light beam reflected by the mask.

A mask having a periodic pattern of parallel lines extending in the plane of the mask will provide a substantially periodic structure in the probe light beam with a number of equally spaced lines. Alternatively, the mask can define a single line beam, a speckle pattern beam, or a dot of light.

When the structured probe light beam has a pattern, which is substantially uniform in one transverse direction and varies in a second transverse direction, such as when the pattern includes a number of lines extending in a plane perpendicular to the optical axis of the probe light beam, the structured beam is preferably moved in a direction perpendicular to the lines and to the optical axis of the projector unit, i.e. the pattern is preferably moved along the second direction. Thereby data for the entire surface can be obtained and not only from the part of the object surface illuminated by the lines at one point in time.

For a probe light beam with a periodic structure of equally spaced lines, the ratio between the widths of the bright regions to the period of the line pattern may be below 0.25, such as below 0.2, such as below 0.1, such as below 0.05, such as below 0.02. A lower ratio, i.e., a thinner line relative to the period of the pattern provides a higher spatial resolution of the scanning at the cost of a prolonged scanning time.

In some embodiments, the structure in the probe light beam is such that in a plane substantially transverse to the optical axis of the projector unit, the light intensity varies according to a checkerboard pattern with alternating relatively brighter and relatively darker regions, where the checkerboard pattern preferably has a periodicity which is substantially uniform over a substantial part of the pattern.

Instead of using a light source and a pattern generating element, the light source may itself provide patterned light such as when the light source comprises an array of light emitters, such as a multi-die LED with a plurality of LED dies arranged in a LED array, where the light emitters are arranged such that the light from the emitters define the pattern of the probe light.

When the pattern comprises a number of individual pattern segments the method may comprise identifying the individual pattern segments of the pattern in each of the recorded 2D images.

In some embodiments, the actuator unit comprises a translation stage arranged to control the position of the mask in a plane perpendicular to the optical axis of the projector unit.

The pattern in the structured probe light beam on the object can then be moved across the object be controlling the position of the mask using the translation stage. Compared to a system where the entire projector unit and imaging unit are moved this is advantageous since a significantly lower mass is moved thus lowering the requirements to the translation stage.

In some embodiments, the movable portion comprises one or more layers of fluid transparent material forming a beam guiding liquid lens, and the actuator unit is configured for controlling the form of the lens by adjusting an electrical field applied to the layer.

When the electrical field is adjusted at least one of the layers of transparent material changes form.

In some embodiments, the fluid lens is wedge-shaped for a first electrical field strength. When such a wedge-shaped lens is placed in the beam path, the optical axis of the probe light beam changes direction, where the change in direction depends on the wedge angle. When the electrical field strength is changed to a second value the fluid lens changes form to a second shape which differs from the wedge-shape of the first electrical field strength.

Accordingly, when changing the electrical field strength from the first to the second value the direction of the optical axis after the fluid lens is changed and the pattern of the structured probe light beam is moved across the object surface.

In some embodiments, the second shape of the fluid lens is also a wedge, where the wedge angles at the first and second electrical field strengths have opposite signs.

In some embodiments, the second shape of the fluid lens is substantially flat.

In some embodiments, the imaging unit is fixed relative to the framework.

Having the imaging unit fixed to the framework while the structured probe light beam is moved across the scanned object provides the advantage that an expensive high-precision linear axis/translation stage otherwise used for precise movements of the relatively heavy imaging unit can be avoided and thus that a low-cost 3D scanner can be realized.

In some embodiments, the 3D scanner comprises a return spring arranged to apply an opposing force to the force-transferring member and actuator unit.

This provides the advantage of an improve control of the rotation and/or movement of the movable portion of the projector unit.

In some embodiments, the projector unit comprises a lens system for imaging the mask onto the object. The lens system is arranged to receive at least a portion of the structured probe light beam and to image the pattern of the structured probe light beam onto the object.

The light source, pattern generating element and the lens system may all be part of the movable portion of the protector unit.

In some embodiments, the actuator unit comprises a motor unit or a piezo electric unit.

In some embodiments, the movable portion comprises at least one component of the lens system. When e.g., translating or rotating a focusing lens arranged in the beam path it can shift the position of the probe light pattern on the object.

In some embodiments, the actuator unit is configured for periodically changing the orientation and/or position of the projector unit such that a periodic movement of the probe light beam pattern over the object is provided.

The imaging unit comprises at least one image sensor, such as two or four image sensors, arranged in a fixed relative arrangement. The image sensors can e.g., be color or monochrome 2D cameras.

In some embodiments, the 3D scanner comprises an object supporting surface supported by the framework. The 3D scanner may comprise means for controlling the orientation and position of the object supporting surface relative to the imaging unit.

In some embodiments, the 3D scanner comprises a control unit connected to the actuator unit for controlling the translation of the structured probe light beam across the object.

In some embodiments, the light source is a multichromatic light source, such as a white light source.

In some embodiments, at least one of the image sensors in the imaging unit is capable of recording color 2D images of the object. This allows for a recording of a digital 3D representation of the object also expressing the object color. The color image sensor may be a CCD with a color filter, such as a Bayer filter.

Disclosed is a method for recording a digital 3D representation of an object, the method comprising:
  providing a 3D scanner comprising a projector unit configured for projecting a beam of probe light onto the object, and an imaging unit arranged to acquire 2D images of the object;
  recording 2D images of the object for a sequence of different positions of the probe light beam on the object, where the probe light is translated across the object between the positions in the sequence by changing the orientation and/or position of a moving portion of the projector unit relative to a framework of the scanner; and
  generating a digital 3D representation expressing the 3D topography of the object based on the recorded 2D images.

Disclosed is a method for recording a digital 3D representation of an object, the method comprising:
  providing a 3D scanner comprising a projector unit configured for projecting a beam of probe light onto the object, an imaging unit arranged to acquire 2D images of the object, and an actuator unit arranged to control the position of the probe light beam at the object by rotating a movable portion of the projector unit around a pivoting axis, where the surface of a wheel operatively coupled to the movable portion of the projector unit has a radial distance from the axis of the rotation motor which changes with the rotation;
  recording 2D images of the object for a sequence of different positions of the probe light beam on the object, where the probe light is translated across the object between the positions in the sequence by changing the orientation of the moving portion of the projector unit by rotating the wheel; and
  generating a digital 3D representation of the object from the recorded 2D images.

Disclosed is a 3D scanner for recording a digital 3D representation of an object, the 3D scanner comprising:
  a projector unit configured for projecting a structured beam of probe light onto the object;
  an imaging unit arranged to acquire 2D images of the object when the object is illuminated by the structured probe light beam; and an actuator unit configured for moving the structured probe light beam across the object by adjusting the orientation and/or position of at least one movable portion of the projector unit relative to a framework of the 3D scanner.

BRIEF DESCRIPTION OF DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
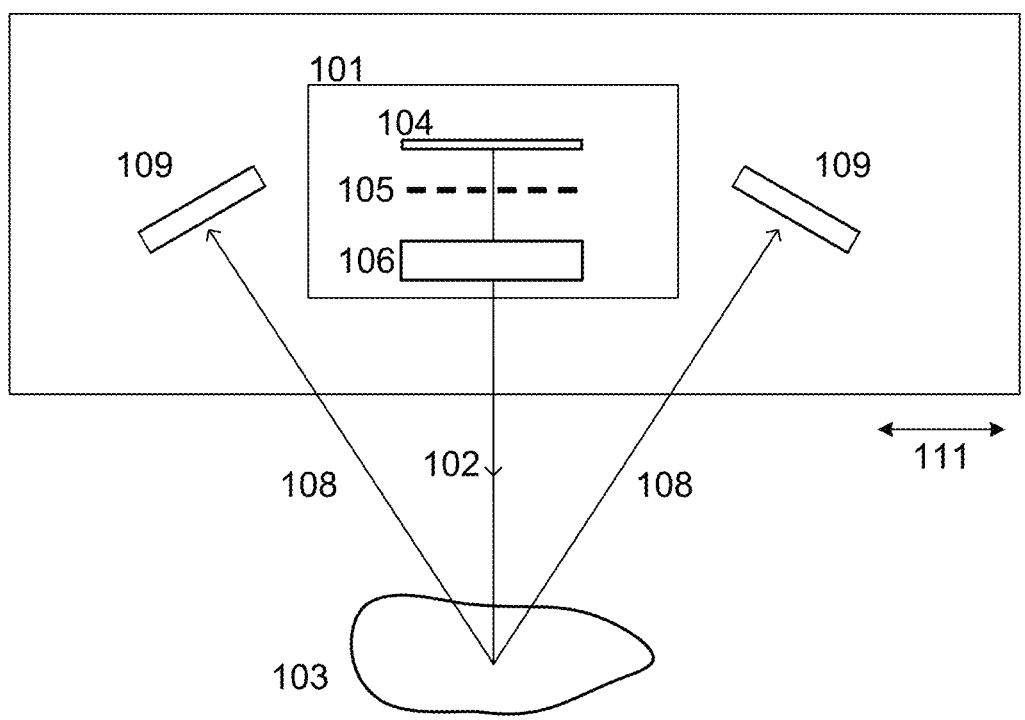
FIG. 1 shows a schematic of a prior art 3D scanner.

FIG. 1 shows a schematic of a prior art 3D scanner 100 using a structured probe light beam for recording a digital 3D representation of an object.

A projector unit 101 projects a structured probe light beam 102 of monochromatic or multi spectral light, such as laser dots, laser lines, white or colored strips, onto the object 103. In the projector unit the beam of probe light from a light source 104 travels through a mask 105 which introduces a pattern in the beam before and a lens system 106 images the structured beam onto the object.

Beams 108 of reflected probe light are captured by cameras 109 in the 3D scanner's imaging unit acquiring 2D images of the pattern imaged onto the object. The projector unit and the imaging unit form at least part of the optical system of the 3D scanner. The light pattern is detected in the acquired 2D images and well-established projection geometry such as triangulation or stereo is used to derive the 3D coordinates for the object surface illuminated by the bright parts of the pattern. This is done for a sequence of different relative positions of the object and the optical system of the 3D scanner. A linear motion 111 of the entire optical system including the projector unit 101 and the cameras 109 moves the pattern across the object such that the 3D scanner can derive the 3D coordinates for the surface of a new part of the object. The linear motion of the optical system is often provided by an expensive high-precision linear axis.

FIG. 2 illustrates an embodiment based on rotation of a projector unit.

The projector unit 201 has a light source 204 emitting light that travels through a mask 205 to produce a structured beam of probe light 202a, 202b which is imaged onto the scanned object by a lens system 206. The imaging unit has two cameras 209 which are fixed in relation to the framework of the scanner (framework not depicted in the figure for simplicity). An elongated force transferring member 212 is attached to the projector unit 201 such that the actuator unit 213 can engage a distal end of the force-transferring member.

Figure 2A:
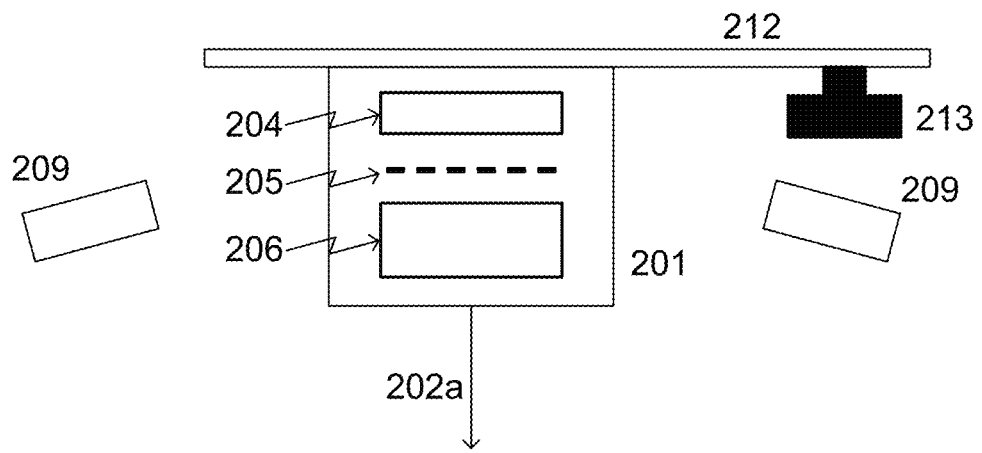
FIGS. 2A-2B and FIG. 3 shows a schematic of a pivoting projector unit.

In FIG. 2A, the actuator unit 213 is in a state where the force-transferring member 212 and the projector unit 201 are arranged horizontally such that the propagation direction of the structured probe light beam 202a is vertical.

Figure 2B:
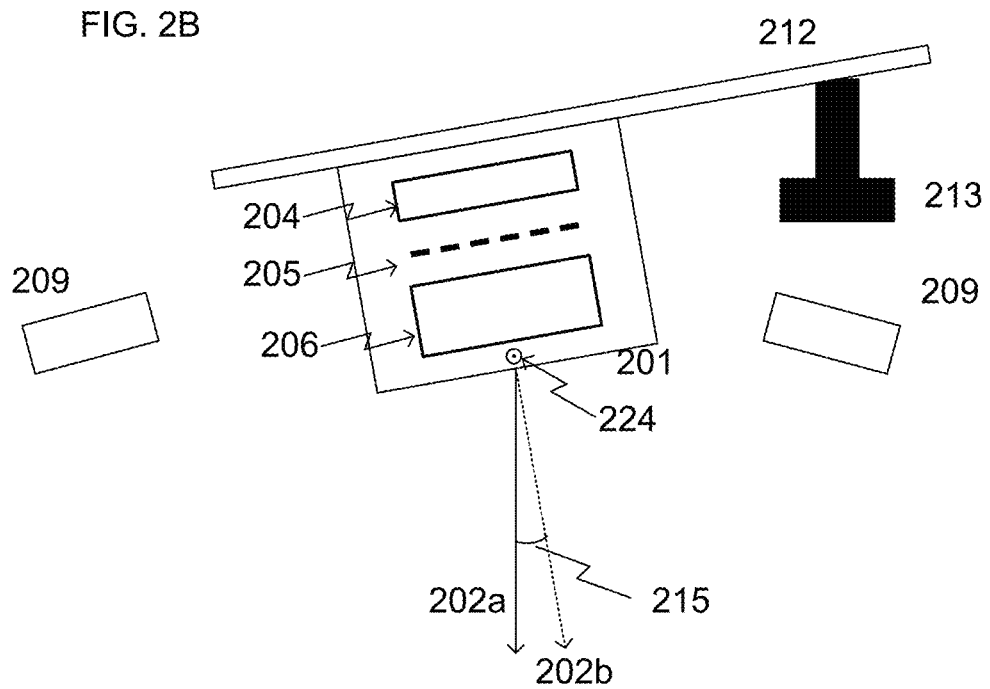

In FIG. 2B the actuator unit 213 displaces the distal end of the force-transferring member 212 such that the force-transferring member and thereby the projector unit is rotated around a pivoting axis 224. The pivoting axis is substantially perpendicular to and intersects the optical axis of the projector unit. The propagation direction of the structured probe light beam 202b then deviates from the direction 202a for the previous arrangement.

When the actuator unit adjust the orientation of the force-transferring member (relative to the 3D scanner framework and the cameras 209) the structured probe light beam is moved across the scanned object. The angle 215 between the propagation directions 202a and 202b, together with the distance to the object, determines the movement of the beam pattern on the sample.

Figure 3:
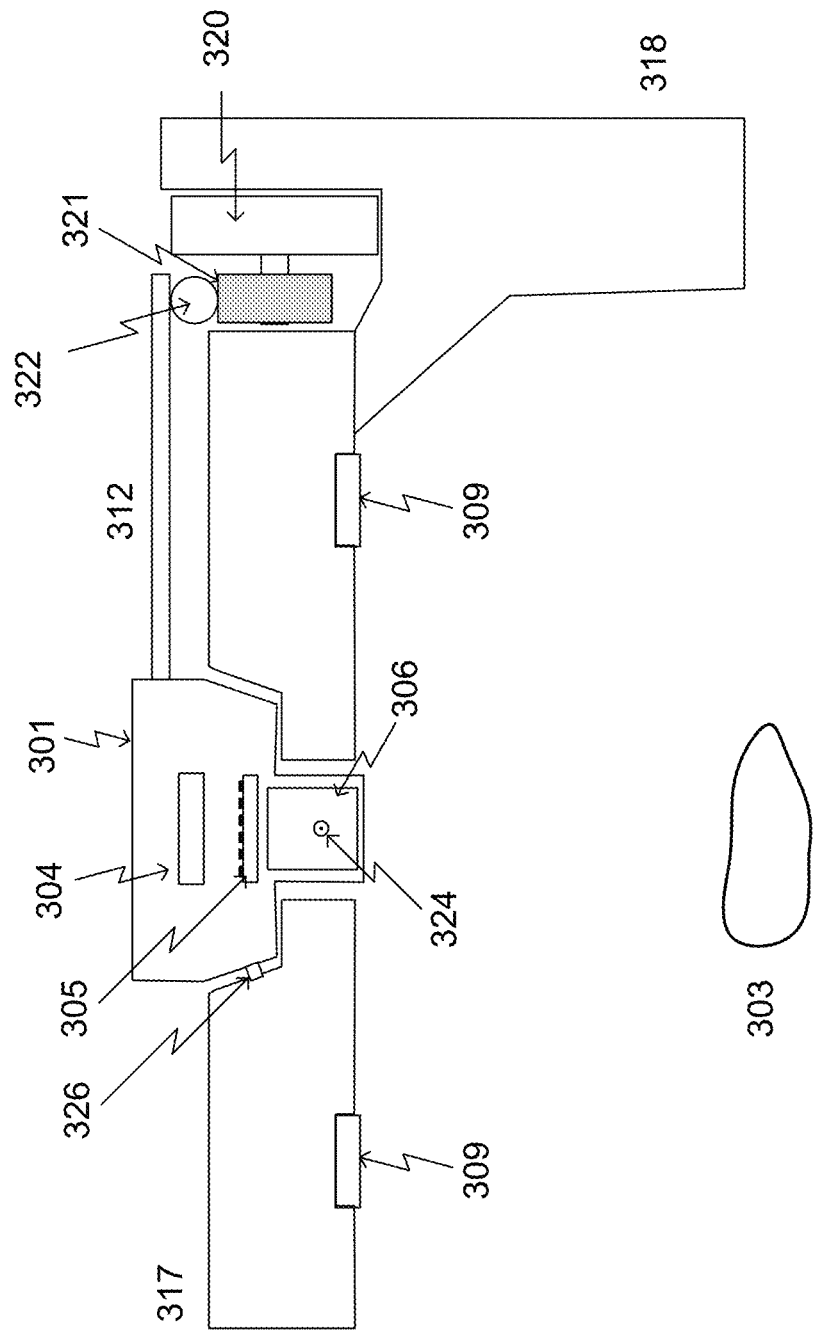

FIG. 3 shows a design of the 3D scanner with rotation of the projector unit.

The projector unit 301 has a light source 304, a mask 305 and a lens system 306 similar to that shown in FIG. 2 producing and imaging a structured beam of probe light onto the scanned object 303. The imaging unit has two cameras 309 which are fixed in relation to the framework 317, 318 of the scanner. An elongated force-transferring member 312 is arranged such that the actuator unit 320, 321, 322 of the scanner engages the distal end of the force-transferring member while the proximal end is attached to the movable portion of the projector unit. The force-transferring member may also be considered being part of the movable portion of the projector unit. In the illustrated design, the actuator unit is based on a rotation motor 320 driving a wheel 321 coupled to the force-transferring member 312 via a low-friction member in the form of a low-friction ball 322. The outer surface of the wheel 321 which applies force to the force-transferring member 312 via the ball 322 has an outer diameter which varies with the orientation of the wheel. When the rotation motor rotates the wheel around the motor's rotation axis, the vertical position of the ball changes. When the radius of the wheel increases the low-friction ball is pushed upwards and with it the distal end of the force-transferring member 312. This provides that the projector unit 301 is rotated around the pivoting axis 324 such that the pattern of the structured probe light beam is moved across the scanned object 303. A return spring 326 is arranged to apply an opposing force to the force-transferring member and actuator unit to improve the control of the rotation of the projector unit 301.

When the wheel 321 is shaped according to an Archimedes spiral, the rotation of the rotation motor is converted into a linear movement of distal end of the force-transferring member 312.

Since the rotation angle of the rotation motor can be controlled dynamically and smoothly, the pattern of the structured probe light beam can be moved dynamically and smoothly across the scanned object.

In one realization of the scanner, the mask has a periodic pattern with 33 periods of alternating 7 μm wide transparent and 185 μm wide opaque lines.

The rotation of the movable portion of the projector unit provides that the structured probe light beam can be swept over an object placed at rest relative to the framework of the 3D scanner.

Figure 4:
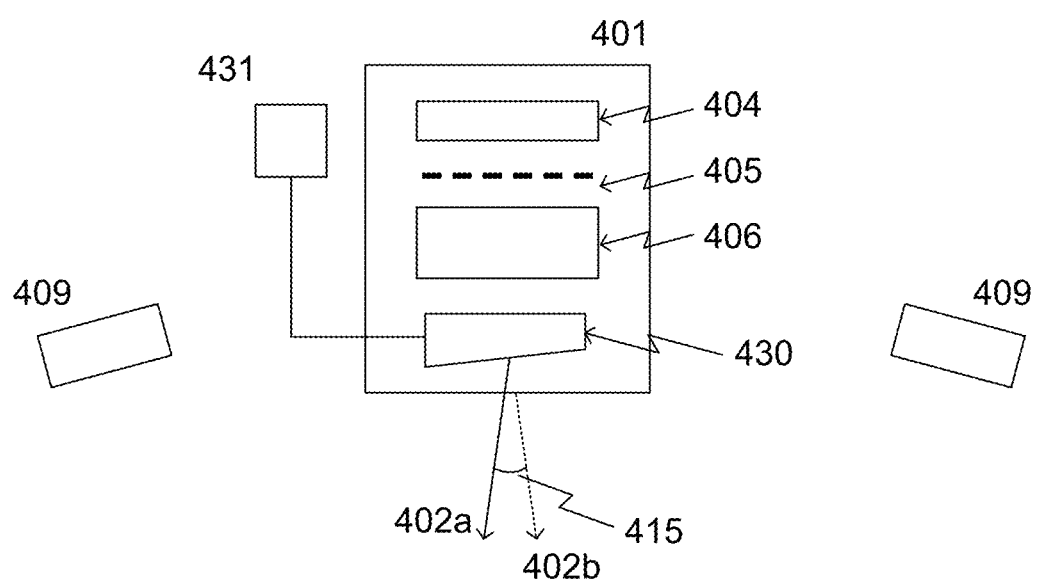
FIG. 4 shows a design of the 3D scanner.

FIG. 4 shows a design of the 3D scanner.

The projector unit has a light source 404, a mask 405, and a lens system 406 similar to that shown in FIG. 2 producing and imaging a structured beam of probe light onto the scanned object. The imaging unit has two cameras 409 which are fixed in relation to the framework of the scanner (not depicted in the figure for simplicity).

The projector unit 401 has beam guiding liquid lens 430 formed by a one or more layers of fluid transparent material. The actuator unit has a device 431 capable of controlling the electrical field applied to the fluid lens such that the shape of the lens can change form from a first to a second form, where the first and second forms both are wedge shape but with wedge angles having different signs. When changing from the first to the second form the structured probe light beam is moved across the scanned object. The angle 415 between the propagating directions 402a, 402b of the structured probe light beam emitted from the projector unit 401 in the first and second forms determine the shift in the position on the object.

Figure 5:
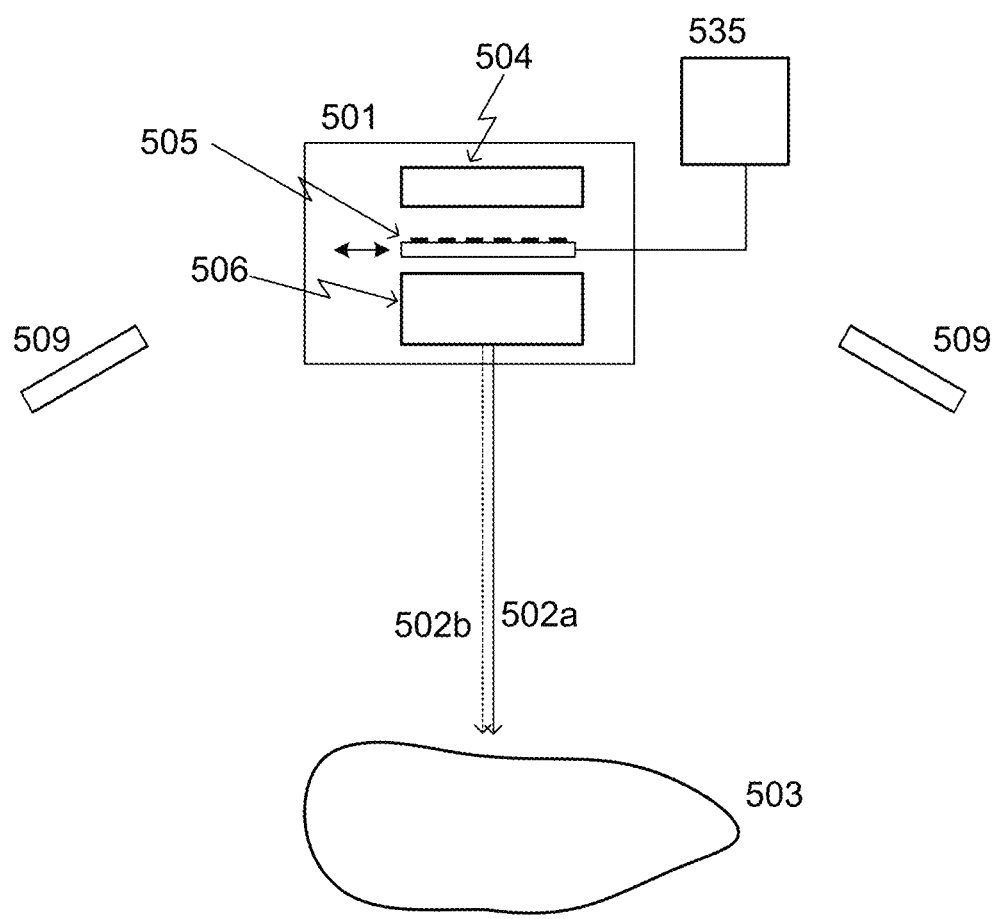
FIG. 5 shows a design of the 3D scanner.

FIG. 5 shows a design of the 3D scanner.

The projector unit 501 has a light source 504, a mask 505, and a lens system 506 similar to that shown in FIG. 2 producing and imaging a structured beam of probe light onto the scanned object. The imaging unit has two cameras 509 which are fixed in relation to the framework of the scanner (not depicted in the figure for simplicity).

The mask is arranged on a translation stage which controls the position of the mask in the plane perpendicular to the optical axis such that the pattern can be moved across the scanned object. A control unit 535 controls the position of the mask in that plane.

FIG. 6 shows a cross-sectional illustration of how a rotation motor with an elliptical wheel can control the position of a probe light beam on the surface of a scanned object.

The projector unit 601 and the elongated force-transferring member 612 are similar to those described in relation to FIG. 3 with the proximal end of the force-transferring member 612 attached to the projector unit 601 and the distal end arranged such that a low-friction ball 622 of the actuator unit can engage it. The projector unit 601 and force-transferring member 612 rotates around a pivoting axis 624 when the vertical position of the distal end of the force-transferring member 612 is changed. The actuator unit has a rotation motor driving an elliptical wheel 621 counterclockwise around a rotation axis 640.

The arrangement of the wheel relative to the projector is slightly different compared to FIG. 3 where the rotation axis of the motor was perpendicular to the pivoting axis. Both arrangements provide that the ball 622 can control the vertical position of the distal end force-transferring member 612.

The outer surface of the wheel 621, which applies force to the force-transferring member 612 via the low-friction ball 622, follows an ellipse such that the vertical position of the surface and hence the ball 622 varies with the orientation of the wheel.

Figure 6A:
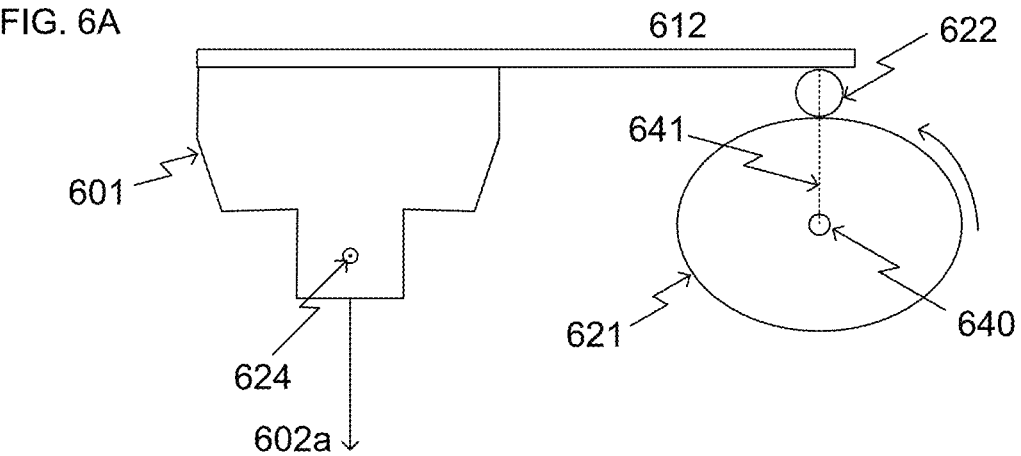
FIGS. 6A-6C show how a rotation motor with an elliptical wheel can control the position of the structured probe light beam.

At the rotation angle illustrated in FIG. 6A the wheel is arranged with its major axis being horizontal and the minor axis pointing towards the low-friction ball. The distance 641 from the rotation axis of the wheel to the part of the ball surface which engages the distal end of the force-transferring member thus has its minimum value. In the illustrated configuration, this corresponds to having the projector unit emitting the structures probe light beam 602a along a vertical direction.

Figure 6B:
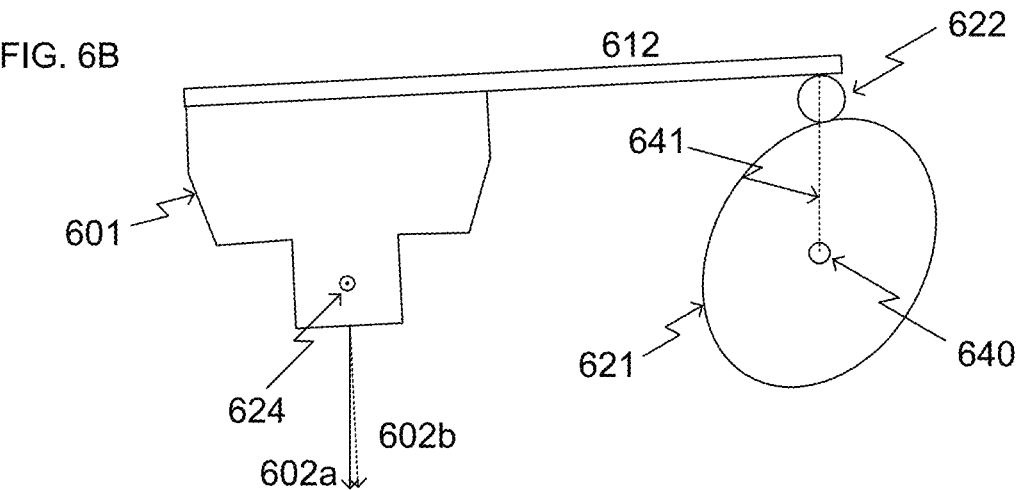

The rotation motor then rotates the wheel 621 anti-clockwise around the motor rotation axis 640 and the radius of the wheel at the low-friction ball thus increases as illustrated in FIG. 6B. The low-friction ball 622 is pushed upwards and with it the distal end of the force-transferring member 612. This provides that the projector unit 601 is rotated around the pivoting axis 624 such that the structured probe light beam 602b leaves the projector unit 601 with a slight angle relative to the vertical direction of the probe light beam 602a when the wheel was arranged as seen in FIG. 6A. Thereby the pattern of the structured probe light beam is moved over the object surface.

Figure 6C:
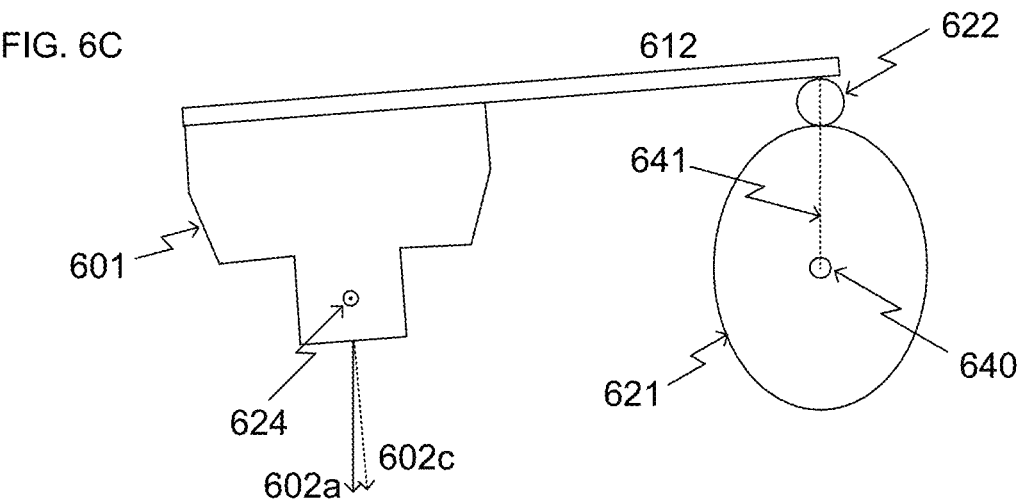

FIG. 6C illustrates the situation where the wheel is arranged with the major axis pointing towards the low-friction ball such that the ball reaches its maximum vertical position and the distance 641 from the rotation axis of the wheel to the part of the ball surface which engages the distal end of the force-transferring member has its maximum value. This provides the maximum offset in the beam position at the object for the given configuration and arrangement of the components of the 3D scanner.

Since the angle of the rotation motor around the rotation axis 640 can be controlled continuously and smoothly, the pattern of the structured probe light beam can be moved continuously and smoothly across the scanned object. For the elliptical wheel, the probe light pattern moves continuously and smoothly back towards the initial position of FIG. 6A both if the anti-clockwise rotation of the wheel according to FIGS. 6A to 6C is continued or if the rotation is reversed.

Embodiments

1. A 3D scanner for recording a digital 3D representation of an object, the 3D scanner comprising:
   a projector unit configured for projecting a structured beam of probe light onto the object;
   an imaging unit arranged to acquire 2D images of the object when the object is illuminated by the structured probe light beam; and
   an actuator unit arranged to control the position of the structured probe light beam at the object by rotating a movable portion of the projector unit around a pivoting axis, the actuator unit comprising a rotation motor comprising or arranged to drive a wheel, where the surface of the wheel operatively coupled to the movable portion of the projector unit has a radial distance from the axis of the rotation motor which changes with the rotation.

2. The 3D scanner according to embodiment 1, wherein the pivoting axis is substantially perpendicular to and intersects the optical axis of the projector unit.

3. The 3D scanner according to embodiment 1 or 2, wherein the actuator unit comprises a low-friction element arranged in contact with said wheel surface, where the low-friction element is operatively coupled to the movable portion of the projector unit.

4. The 3D scanner according to embodiment 1, 2 or 3, wherein the actuator unit is arranged to directly engage the movable portion of the projector unit.

5. The 3D scanner according to embodiment 1, 2, 3 or 4, wherein a force-transferring member is part of or is attached to the movable portion of the projector unit, and where the actuator unit is arranged to engage a distal end of the force-transferring member.

6. The 3D scanner according to any one or more of embodiments 1 to 5, wherein said wheel surface is eccentric or is shaped according to an Archimedes spiral.

7. The 3D scanner according to any one or more of embodiments 1 to 6, wherein said wheel surface is smooth.

8. The 3D scanner according to any one or more of embodiments 5 to 7, wherein the force-transferring member comprises an elongated member.

9. The 3D scanner according to embodiment 8, wherein the length of the elongated member is at least 2 cm, such as at least 3 cm, such as at least 5 cm, such as at least 8 cm, such as at least 10 cm, such as at least 15 cm.

10. The 3D scanner according to any one or more of embodiments 1 to 9, wherein the axis of the rotation motor is perpendicular to the optical axis of the projector unit.

11. The 3D scanner according to any one or more of embodiments 1 to 10, wherein the projector unit comprises a light source and a mask arranged to introduce the structure in the probe light beam, where the mask has a fixed geometry.

12. The 3D scanner according any one or more of embodiments 1 to 11, wherein the imaging unit is fixed relative to the framework.

The invention claimed is:

1. A 3D scanner for recording a digital 3D representation of an object, the 3D scanner comprising:
    a projector unit configured for projecting a structured beam of probe light comprising a spatial pattern onto the object which is placed in a scan volume, the object comprising a dental impression or a physical dental object;
    an imaging unit arranged to acquire 2D images of the pattern imaged onto the object when the object is illuminated by the structured beam; and
    an actuator unit arranged to control the position of the structured beam at the object by rotating a movable portion of the projector unit around a pivoting axis, the actuator unit comprising a rotation motor comprising or arranged to drive a wheel, where a surface of the wheel is operatively coupled to the movable portion of the projector unit,
    wherein the movable portion of the projector unit comprises a light source, wherein the light source is movable around the pivoting axis,
    wherein the actuator unit comprises a second pivoting axis, wherein the second pivoting axis is orthogonal to the pivoting axis of the movable portion of the projector unit.

2. The 3D scanner according to claim 1, wherein the pivoting axis is substantially perpendicular to and intersects the optical axis of the projector unit.

3. The 3D scanner according to claim 1, wherein the actuator unit comprises a low-friction element arranged in contact with said wheel surface, where the low-friction element is operatively coupled to the movable portion of the projector unit.

4. The 3D scanner according to claim 3, wherein the low-friction element comprises a ball or a roller.

5. The 3D scanner according to claim 3, wherein the low-friction element comprises a coating over the wheel surface, the coating being configured to reduce friction.

6. The 3D scanner according to claim 1, wherein the actuator unit is arranged to directly engage the movable portion of the projector unit.

7. The 3D scanner according to claim 1, wherein a force-transferring member is part of or is attached to the movable portion of the projector unit, and where the actuator unit is arranged to engage a distal end of the force-transferring member.

8. The 3D scanner according to claim 7, wherein the force-transferring member comprises an elongated member.

9. The 3D scanner according to claim 8, wherein the length of the elongated member is at least 2 cm.

10. The 3D scanner according to claim 7, further comprising a return spring arranged to apply an opposing force to the force-transferring member and actuator unit.

11. The 3D scanner according to claim 1, wherein said wheel surface is eccentric or is shaped according to an Archimedes spiral.

12. The 3D scanner according to claim 1, wherein said wheel surface is smooth.

13. The 3D scanner according to claim 1, wherein the axis of the rotation motor is perpendicular to the optical axis of the projector unit.

14. The 3D scanner according to claim 1, wherein the projector unit comprises a mask arranged to introduce the structure in the probe light beam, where the mask has a fixed geometry.

15. The 3D scanner according to claim 1, wherein the imaging unit is fixed relative to the framework.

16. The 3D scanner according to claim 1, wherein the structured beam includes a pattern of lines.

17. The 3D scanner according to claim 1, wherein the structured beam includes a pattern of laser dots, laser lines, white or colored strips.

18. The 3D scanner according to claim 1, wherein the spatial pattern comprises a checkerboard pattern with alternating relatively brighter and relatively darker regions.

19. The 3D scanner according to claim 1, wherein the 3D scanner is configured to generate the digital 3D representation expressing at least 3D topography of the object based on the acquired 2D images.

20. The 3D scanner according to claim 1, wherein the 3D scanner is configured to be connected to a data processing unit so that the data processing unit can generate the digital 3D representation expressing at least 3D topography of the object based on the acquired 2D images.

21. The 3D scanner according to claim 1, wherein the actuator unit is arranged to engage indirectly, via one or more intermediate components, with the movable portion of the projector unit.

22. The 3D scanner according to claim 1, wherein the projector unit comprises a mask, which mask is arranged to introduce the pattern in the probe light, the mask comprising a transmission mask comprising alternating regions of higher and lower transmissivity, or a reflective mask comprising regions with different reflectance.

23. The 3D scanner according to claim 22, wherein the mask comprises deposited materials comprising reflective or absorbing material on a surface of a plate defining the regions.

24. The 3D scanner according to claim 1, wherein the light source comprises an array of light emitters arranged such that light from the emitters defines the pattern of the structured beam of probe light.

25. The 3D scanner according to claim 24, wherein the array of light emitters comprises a multi-die LED with a plurality of LED dies arranged in an LED array.

26. The 3D scanner according to claim 1, wherein the imaging unit comprises at least two cameras that are fixed in relation to a framework of the scanner.

27. The 3D scanner according to claim 1, wherein the projector unit comprises a mask, wherein the spatial pattern comprises a periodic pattern of parallel lines extending in a plane of the mask, wherein the pattern of parallel lines is configured to provide a substantially periodic structure in the probe light beam with a number of equally spaced lines.

28. The 3D scanner according to claim 1, wherein the projector unit comprises a mask, wherein the mask is arranged such that a beam of the probe light is configured to travel through the mask prior to the structured beam of probe light being received at a lens system.

29. The 3D scanner according to claim 1, wherein the projector unit comprises a mask, wherein the mask is arranged between the light source and a lens system that is configured to receive the structured beam of probe light.

30. The 3D scanner according to claim 1, wherein the projector unit comprises a mask, wherein the mask is arranged on a translation stage that is configured to control a position of the mask in a plane perpendicular to an optical axis of the structured beam such that the spatial pattern is moved across the scanned object.

31. The 3D scanner according to claim 30, further comprising a control unit configured to control the position of the mask in the translation plane.

32. The 3D scanner according to claim 1, wherein the movable portion of the projector unit comprises a lens system, wherein the lens system is movable around the pivoting axis, wherein the lens system is configured to receive the structured beam of probe light.

33. A 3D scanner for recording a digital 3D representation of an object, the object comprising a dental impression or a physical dental object, the 3D scanner comprising:
  a projector unit comprising a light source and a mask, the projector unit being configured for projecting a structured beam of probe light onto the object which is placed in a scan volume, and
  the mask is arranged to introduce a spatial pattern in the structured beam of probe light, wherein the mask is a transmission mask comprising alternating regions of higher and lower transmissivity, or a reflective mask comprising regions with different reflectance;
  an imaging unit arranged to acquire 2D images of the spatial pattern imaged onto the object when the object is illuminated by the structured beam of probe light; and
  an actuator unit arranged to control the position of the structured beam at the object by rotating a movable portion of the projector unit around a pivoting axis, the actuator unit comprising a rotation motor comprising or arranged to drive a wheel, where a surface of the wheel is operatively coupled to the movable portion of the projector unit and has a radial distance from the axis of the rotation motor which changes with the rotation,
  wherein the movable portion of the projector unit comprises the light source, wherein the light source is movable around the pivoting axis,
  wherein the actuator unit comprises a second pivoting axis, wherein the second pivoting axis is orthogonal to the pivoting axis of the movable portion of the projector unit.

34. The 3D scanner according to claim 33, wherein the movable portion of the projector unit comprises a lens system, wherein the lens system is movable around the pivoting axis, wherein the lens system is configured to receive the structured beam of probe light.

35. A 3D scanner for recording a digital 3D representation of an object, the 3D scanner comprising:
  a projector unit configured for projecting a structured beam of probe light onto the object which is placed in a scan volume, the object comprising a dental impression or a physical dental object;
  wherein the projector unit comprises a light source that comprises an array of light emitters arranged such that light from the emitters defines a spatial pattern of the structured beam of probe light;
  an imaging unit arranged to acquire 2D images of the object when the object is illuminated by the structured beam; and
  an actuator unit arranged to control the position of the structured beam at the object by rotating a movable portion of the projector unit around a pivoting axis, the actuator unit comprising a rotation motor comprising or arranged to drive a wheel, where a surface of the wheel is operatively coupled to the movable portion of the projector unit,
  wherein the movable portion of the projector unit comprises the light source, wherein the light source is movable around the pivoting axis,
  wherein the actuator unit comprises a second pivoting axis, wherein the second pivoting axis is orthogonal to the pivoting axis of the movable portion of the projector unit.

36. The 3D scanner according to claim 35, wherein the array of light emitters comprises a multi-die LED with a plurality of LED dies arranged in an LED array.

37. The 3D scanner according to claim 35, wherein the movable portion of the projector unit comprises a lens system, wherein the lens system is movable around the pivoting axis, wherein the lens system is configured to receive the structured beam of probe light.

38. A 3D scanner for recording a digital 3D representation of an object, the 3D scanner comprising:
  a projector unit configured for projecting a structured beam of probe light comprising a spatial pattern onto the object which is placed in a scan volume, the object comprising a dental impression or a physical dental object;
  an imaging unit arranged to acquire 2D images of the pattern imaged onto the object when the object is illuminated by the structured beam; and
  an actuator unit arranged to control the position of the structured beam at the object by rotating a movable portion of the projector unit around a pivoting axis, the actuator unit comprising a rotation motor comprising or arranged to drive a wheel, where a surface of the wheel is operatively coupled to the movable portion of the projector unit,
  wherein the movable portion of the projector unit comprises a lens system, wherein the lens system is movable around the pivoting axis, wherein the lens system is configured to receive the structured beam of probe light.

* * * * *